(12) United States Patent
Xu et al.

(10) Patent No.: US 9,479,579 B2
(45) Date of Patent: Oct. 25, 2016

(54) GROUPING PROCESSING METHOD AND SYSTEM

(71) Applicant: Tencent Technology (Shenzhen) Company Limited, Shenzhen (CN)

(72) Inventors: Xiaomin Xu, Shenzhen (CN); Weiming Luo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 115 days.

(21) Appl. No.: 14/316,093

(22) Filed: Jun. 26, 2014

(65) Prior Publication Data

US 2014/0359104 A1 Dec. 4, 2014

(30) Foreign Application Priority Data

Jun. 3, 2013 (CN) .......................... 2013 1 0216074

(51) Int. Cl.
| | |
|---|---|
| G06F 15/16 | (2006.01) |
| H04L 29/08 | (2006.01) |
| H04W 4/08 | (2009.01) |
| H04W 4/12 | (2009.01) |
| H04L 29/06 | (2006.01) |

(52) U.S. Cl.
CPC ............ *H04L 67/1044* (2013.01); *H04W 4/08* (2013.01); *H04L 67/38* (2013.01); *H04W 4/12* (2013.01)

(58) Field of Classification Search
CPC .... H04L 67/1044; H04L 67/38; H04W 4/08; H04W 4/12; G10H 2210/281; G10H 7/004
See application file for complete search history.

(56) References Cited

U.S. PATENT DOCUMENTS

| | | | | |
|---|---|---|---|---|
| 9,199,165 | B2 * | 12/2015 | Zahn | H04N 21/4781 |
| 2006/0258462 | A1 * | 11/2006 | Cheng | G07F 17/32 463/42 |
| 2007/0073974 | A1 * | 3/2007 | Averill | G06F 12/128 711/133 |
| 2009/0275414 | A1 * | 11/2009 | Lee | A63F 13/12 463/42 |
| 2012/0137287 | A1 * | 5/2012 | Pang | G06F 9/45558 718/1 |
| 2013/0344903 | A1 * | 12/2013 | Li | H04W 4/08 455/458 |
| 2014/0006517 | A1 * | 1/2014 | Hsiao | G06Q 50/01 709/205 |

FOREIGN PATENT DOCUMENTS

| | | |
|---|---|---|
| CN | 1858782 A | 11/2006 |
| CN | 101272609 A | 9/2008 |
| CN | 102647666 A | 8/2012 |
| CN | 103297297 A | 9/2013 |

OTHER PUBLICATIONS

International Search Report and Written Opinion dated Jun. 16, 2014 for International Application No. PCT/CN2014/073189, 12 pages.

* cited by examiner

*Primary Examiner* — Moustafa M Meky
*Assistant Examiner* — Thorne E Waugh
(74) *Attorney, Agent, or Firm* — Brinks Gilson & Lione

(57) ABSTRACT

The present disclosure provides a grouping processing method and system, the method comprises: monitoring a number of users accessing a sub-group that is corresponding to a group; and according to the number of users in the sub-group and a preset threshold of the number of users for the sub-group, adjusting the sub-group corresponding the group and/or user access which the sub-group corresponds a physical resource equipment and the physical resource equipment corresponds to more than one of sub-groups.

10 Claims, 5 Drawing Sheets

GROUPING PROCESSING METHOD AND SYSTEM

CROSS-REFERENCE TO RELATED APPLICATIONS

This application is a continuation of International Application No. PCT/CN2014/073189, filed on Mar. 11, 2014, which claims priority to Chinese Patent Application No. 201310216074.4, filed on Jun. 3, 2013, which is incorporated by reference in its entirety.

FIELD OF THE TECHNOLOGY

The present disclosure relates to the computer technology field, in particular to a grouping processing method and grouping processing system.

BACKGROUND

In the present Internet application technology, many Internet products involve the application of user groups and other groups, such as groups in instant messaging products, game rooms in online games, etc.

SUMMARY

The present disclosure provides a grouping processing method and system, the method includes the steps of:

monitoring, by a device having a processor, a number of users accessing a sub-group of physical resource equipment servicing a group; and according to the number of users accessing the sub-group, and a preset threshold of the number of users for the sub-group, adjusting, by the device, the sub-group servicing the group, which the physical resource equipment services more than one sub-groups.

The grouping processing system that is provided by the present disclosure includes: one or more processors; memory; a monitoring module stored in the memory and to be executed by the one or more processors that is configured to monitor a number of users accessing a sub-group that is corresponding to a group; and a grouping adjusting module stored in the memory and to be executed by the one or more processors that is configured to adjust, according to the number of users in the sub-group and a preset threshold of the number of users for the sub-group, the sub-group corresponding to the group and/or user access, which the sub-group corresponds a physical resource equipment and the physical resource equipment corresponds to more than one of sub-groups.

The present disclosure also provides a non-transitory computer readable storage medium comprising instructions, when executed by a processor, to: monitor a number of users accessing a sub-group that is corresponding to a group; according to the number of users in the sub-group and a preset threshold of the number of users for the sub-group, adjust the sub-group corresponding to the group and/or user access which the sub-group corresponds a physical resource equipment and the physical resource equipment corresponds to more than one of sub-groups; add a new sub-group that is corresponding to the group wherein the preset threshold of the number of users for the sub-group includes the preset first threshold when the number of users in the sub-group corresponding to the group is greater than or equal to a preset first threshold; and connect the users of the more than one the sub-groups to one of the more than one of sub-groups wherein the preset threshold of the number of users for the sub-group includes the preset second threshold when a sum of the number of users in the more than one of sub-groups corresponding to the group is less than a preset second threshold.

BRIEF DESCRIPTION OF THE DRAWINGS

The grouping processing method and system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified. The drawings are for illustrative purposes only. One with ordinary skilled in the art may create variations of drawings.

DETAILED DESCRIPTION

Figure 1:
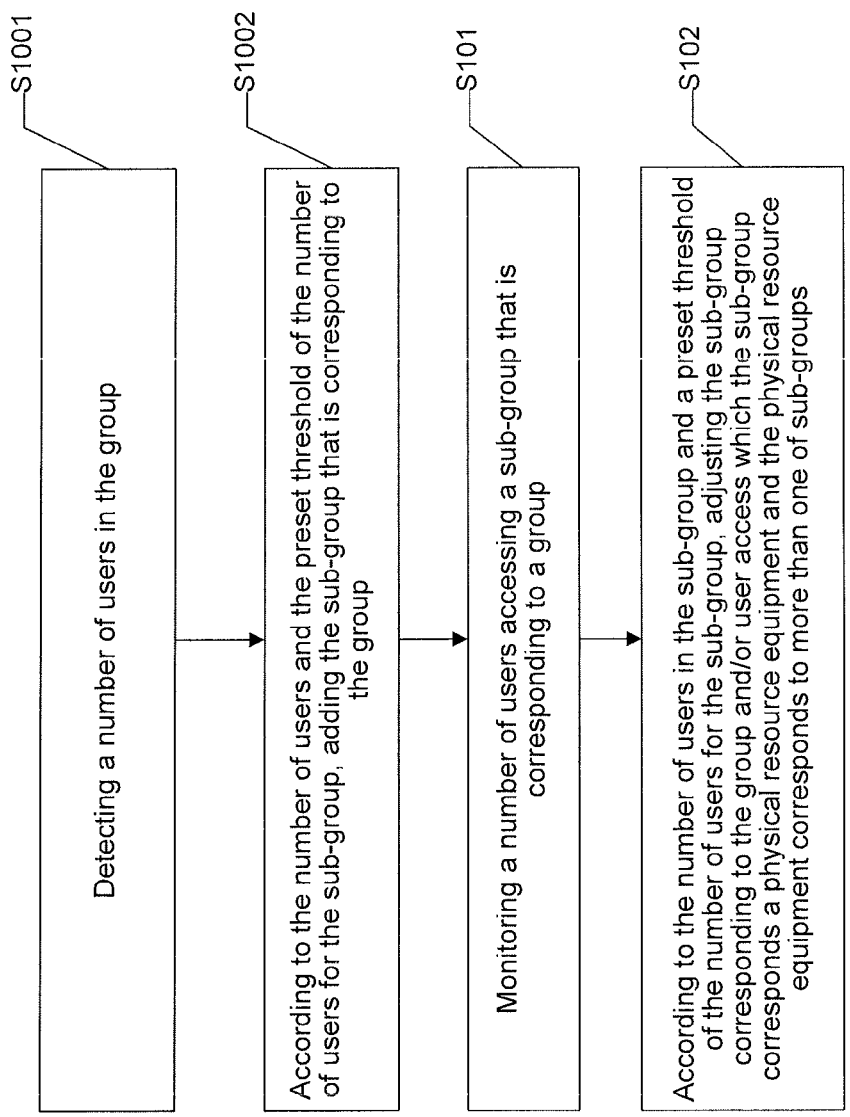
FIG. 1 is the flow diagram of the grouping processing method.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client can be stationary or mobile.

A server, as used herein, may refer to one or more server computers configured to provide certain server functionalities, such as database management and search engines. A server may also include one or more processors to execute computer programs in parallel.

In the current application services specific to groups, it is usually the same server provides all users in the same group with processing services.

For small groups with a small number of users, a single server can easily provide services for users in small groups. Under the circumstances of a small number of users in small groups, a server may even provide services for multiple such small groups.

But for large groups with a larger number of users, a dedicated server is generally adopted to provide services for large groups and super-large scale groups for centralized processing. In the process of practical application, however, the number of users is dynamically changed in groups. Based on the current method of distinguishing small groups and large groups and then setting different servers to provide services for small groups and large groups, it is single in the design of proportion of servers and cannot achieve unification, the scheduling and arrangement of servers are tightly coupled together with the proportion of groups, which is not conducive to the optimization of resource scheduling strategy.

The present disclosure mainly aims to provide a group processing method and a group processing system specific to solve the above problems in the existing technology. The present disclosure dynamically adapts the dynamic changes in the number of users in groups, which is advantageous to the optimization of resource scheduling strategy.

We will give a detailed description of the scheme of the present disclosure below in combination with embodiments therein. In the following description, we will first give a description specific to the group processing method of the present disclosure, and then give a description specific to the group processing system of the present disclosure.

FIG. 1 shows the flow diagram of the group processing method in the embodiment of the present disclosure. As shown in FIG. 1, the group processing method in the present disclosure includes the following steps:

Step S101: monitoring a number of users accessing a sub-group that is corresponding to a group;

Step S102: according to the number of users in the sub-group and a preset threshold of the number of users for the sub-group, adjusting the sub-group corresponding to the group and/or user access which the sub-group corresponds a physical resource equipment and the physical resource equipment corresponds to more than one of sub-groups.

In the step of adjusting, the group and/or user access refers to the adjustment may correspond to the group or the user access such as how many users for access a group, or the adjustment may correspond to the group and the user access. All following "the group and/or user access" throughout this disclose may be used for the same purpose.

According to the scheme in the embodiment, grouping processing service is provided through sub-groups corresponding to groups to realize scheduling of resources based on sub-groups. When a variety of services are provided specific to groups, resource scheduling service is provided in sub-groups. Any sub-group corresponds to any physical resource equipment, any physical resource equipment corresponds to more than one sub-group, and thus we do not need to care about the specific resources of specific physical resource equipment and jump out of the constraint to the service capability of physical resource equipment. Thus we can dynamically adapt the dynamic change in the number of users in groups, which is conducive to the optimization of resource scheduling strategy.

The sub-group mentioned in the present disclosure actually may be understood as the unit preset for scheduling of resources providing services for groups, wherein, any sub-group can correspond to any physical resource equipment, any physical resource equipment can correspond to more than one sub-group, namely that any physical resource equipment can provide more than one sub-group. Such a sub-group may be understood as an abstract group.

Figure 2:
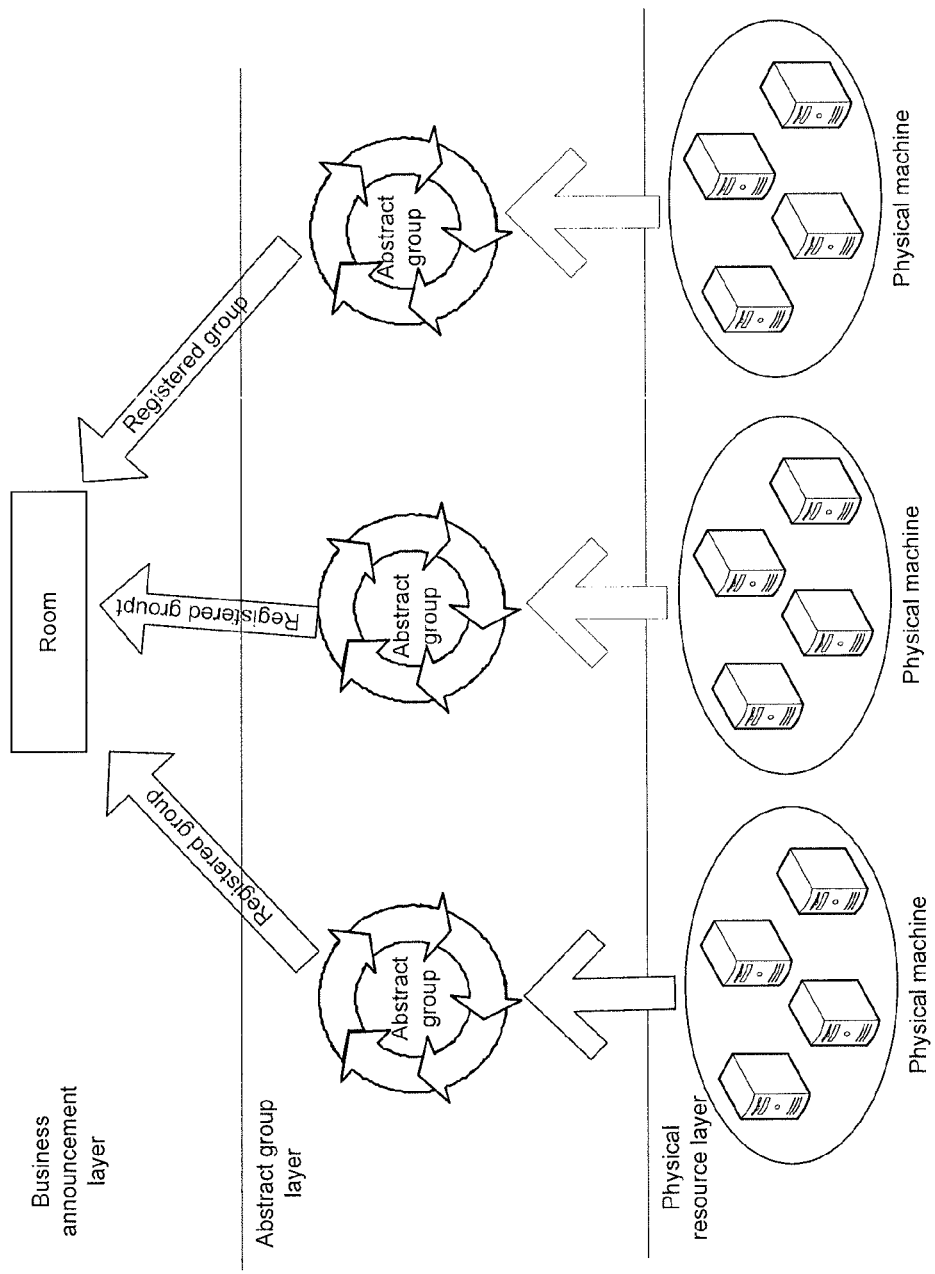
FIG. 2 is the system architecture principle diagram based on sub-groups.

To facilitate a more clear understanding of the sub-group of the present disclosure, FIG. 2 shows a system architecture principle diagram based on the sub-group of the present disclosure. As mentioned above, the sub-group in the embodiment of the present disclosure may be understood as an abstract group. Therefore, we give a description by taking the abstract sub-group as an example on behalf of the sub-group in the embodiment scheme of the present disclosure as shown in FIG. 2. An architecture schematic diagram of the relationship between abstract groups and that between abstract groups and physical resource equipment in the room by taking the group in a room of a network application (online game, voice interaction application, network video application, etc.) as an example, as shown in FIG. 2. To facilitate understanding, we call the physical resource equipment as physical resource layer, the abstract group provided by physical resource equipment as abstract group layer, and the room corresponding to group as business announcement layer as shown in FIG. 2.

As shown in FIG. 2, the physical resource equipment may be in one or a group to provide group processing capacity, and the physical resource equipment may be different in group processing capacities. The specific group processing capacity relates to the largest number of users that may be contained in preset sub-groups, i.e. the preset threshold value of the number of users in the groups. For example, suppose that the preset threshold value of the number of users in the groups is K, namely that K users are taken as a sub-group, one of the physical resource equipment can provide service for 5K users, then the group processing capacity of the physical resource equipment based on the preset threshold value of the number of users in the groups is 5. In other words, the group processing capacity of the physical resource equipment may provide 5 abstract groups.

The preset threshold value of the number of users in the groups may be the same to the above preset threshold value of the number of users in the groups, and the above preset threshold value of the number of users in the groups may also be set based on the preset threshold value of the number of users in the groups. For example, the preset threshold value of the number of users in the groups can be the value obtained by multiplying the preset threshold value of the number of users in the groups by a certain proportion, we can adjust the sub-groups corresponding to groups and/or sub-groups accessed by users when the number of users in sub-groups reaches or exceeds the proportion value, and the specific proportion value can be set based on the actual needs.

Thus, we may add a corresponding quantity of sub-groups or abstract groups for the groups based on the actual number of users in the groups after knowing the group processing capacity of the physical resource equipment. When adding corresponding sub-groups or abstract groups to the groups, we do not care about which physical resource equipment provides the sub-groups or abstract groups specifically, just add the sub-groups or abstract groups directly as corresponding to the groups, in other words, register the sub-groups or abstract groups to the room of the groups. Thus, the sub-group or abstract group corresponding to a group may be provided by the same physical resource equipment or jointly provided by different physical resource equipment. Among different physical resource equipment, any physical resource equipment only provides one or more of these sub-groups or abstract groups. Thus, when providing service for groups, we do not need to care about the specific processing capacity of physical resource equipment, but only provide service and schedule groups based on sub-groups or abstract groups.

As mentioned above, the sub-groups corresponding to the groups should have already existed when we monitor the number of users accessing the sub-groups corresponding to the groups and then adjust the sub-groups corresponding to the groups and/or the sub-groups accessed by users. Therefore, it can also include the following steps before the above Step S101 as shown in FIG. 1:

Step S1001: Detecting a number of users in the group;

Step S1002: According to the number of users and the preset threshold of the number of users for the sub-group, adding the sub-group that is corresponding to the group.

The preset threshold value of the number of users in the groups here may be set based on the actual needs. In general, the preset threshold value of the number of users in the groups can be only a value, that is to say, the threshold values of the number of users in the sub-groups are the same. In some special circumstances, we can set more than two preset threshold values of the number of users in the groups, so that we can assign adaptive sub-groups for the groups based on the actual size of each sub-group.

In addition, since the preset threshold values of the number of users in the groups may be set based on the preset threshold value of the number of users in the groups, as mentioned above. In this case, with different preset threshold values of the number of users in the groups, the preset threshold value of the number of users in the groups corresponding each sub-group may or may not the same, but they can be set based on the same scale, for example, all the preset threshold values of the number of users in the groups corresponding to the sub-groups are 80%, 85% . . . etc. of corresponding preset threshold value of the number of users, and a lot of details may be derived from here and will not be provided in the present disclosure.

The method and system may be used for migration of the currently existing grouping processing method by detecting the number of users in groups and adding sub-groups corresponding to the groups herein, for example, adjust the existing method of corresponding coupling between groups and server into the method of corresponding coupling between groups and sub-groups in the embodiment of the present disclosure, etc. In the case of a new group, we can first build a sub-group corresponding to the group, then make dynamic adjustment of the sub-group corresponding to the group based on the change in the number of users accessing the group in the follow-up process, and the dynamic adjustment here may be either addition of corresponding new sub-group to the group or reduction of corresponding sub-group from the group.

Due to the real-time change characteristic of the number of users in the groups, the user access request from the user to request for accessing the group may be received at any time in the follow-up process. Upon receiving the user access request, the user can be accessed into any sub-group corresponding to the group and having the number of users less than the preset first threshold value.

As mentioned above, due to the real-time change characteristic of the number of users in the groups, the number of users in the groups has real-time dynamic changes, so we need to dynamically adjust the sub-group corresponding to the group to adapt to the number of users in the group. During dynamic adjustment, as mentioned above, we need to access the number of users in the sub-groups for monitoring, and adjust the sub-group corresponding to the group and/or the sub-group accessed by users based on the number of users in the monitored sub-groups. For specific adjustment, since it may involve an increase in the number of users and a decrease in the number of users, we will give detailed description of the adjustment process at the time of an increase in the number of users and decrease in the number of users in combination below.

Figure 3:
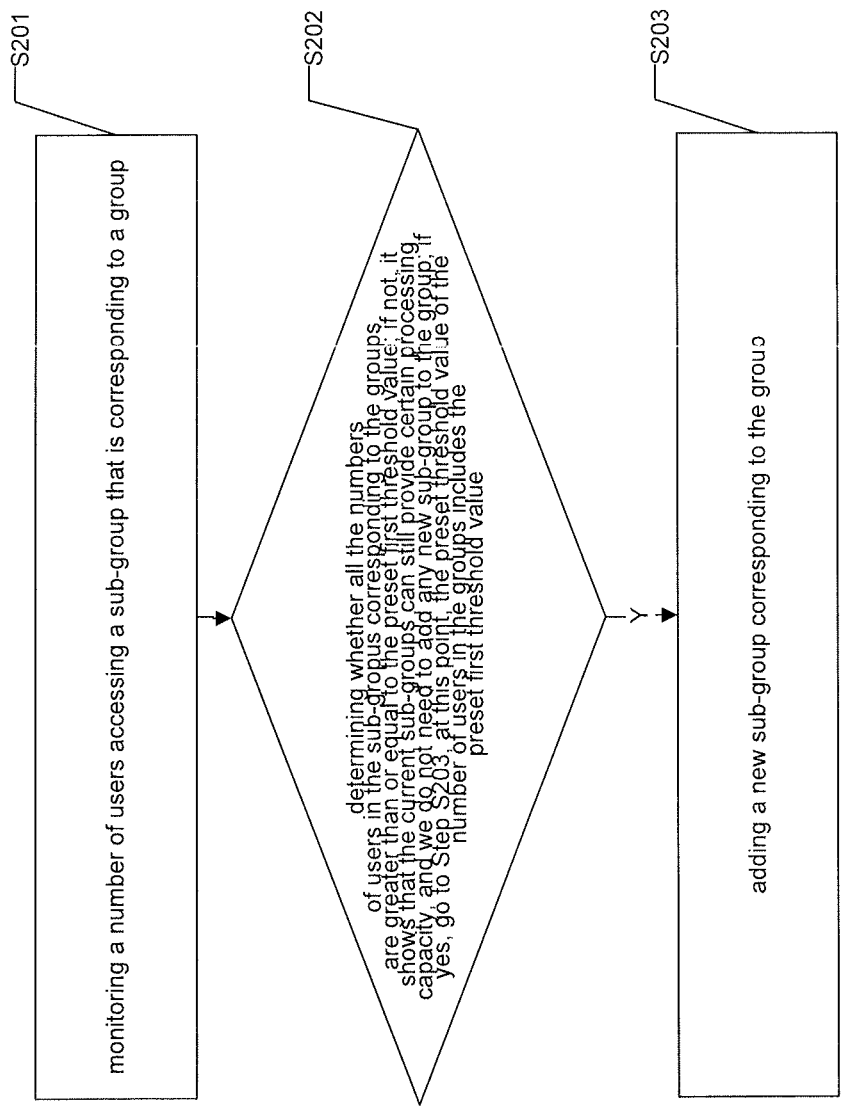
FIG. 3 is the flow diagram of dynamic adaptation based on the grouping processing method when the number of users of groups is increased.

The flow diagram of adjustment of group processing method based on the above embodiment of the present disclosure at the time of an increase in the number of users in the groups in a concrete example is shown in FIG. 3. Only illustration for the process from the number of users in the monitored sub-group to the increase in sub-groups is available, as shown in FIG. 3.

The group processing method in the concrete example includes the following steps, as shown in FIG. 3:

Step S201: monitoring the number of users accessing the sub-groups corresponding to groups;

Step S202: determining whether all the numbers of users in the sub-groups corresponding to the groups are greater than or equal to the preset first threshold value; if not, it shows that the current sub-groups can still provide certain processing capacity, and we do not need to add any new sub-group to the group; if yes, go to Step S203, at this point, the preset threshold value of the number of users in the groups includes the preset first threshold value;

Step S203: adding a new sub-group corresponding to the group.

The preset first threshold value here may be set based on the actual needs. For example, we can set it as the same to the preset threshold value of the number of users in the groups for sub-groups. The preset first threshold value may also be set as a value less than the preset threshold value of the number of users in the groups in order to avoid the sub-groups up to the saturated capacity. This value can be either a specific number of users or the proportion relative to the preset threshold value of the number of users in the groups. In the case of different preset threshold values of the number of users in the groups set for the sub-groups as mentioned above, the preset first threshold values corresponding to the sub-groups can also be different, and a lot of details may be derived from here and will not be provided in the present disclosure.

When adding a new sub-group corresponding to the group, we can add a new sub-group to the group immediately after all the numbers of users in the sub-groups are monitored to be greater than or equal to the preset first threshold value, so we can directly assign the new user to the new sub-group when the user access request is received subsequently. In another implementation mode, a new sub-group corresponding to the group may also be added after all the numbers of users in the sub-groups are monitored to be greater than or equal to the preset first threshold value when the user access request is received, and assign the new user to the new sub-group. The specific implementation mode can be set based on the actual needs, and a lot of details may be derived from here and will not be provided in the present disclosure.

When the new sub-group corresponding to the group is added, if the preset first threshold value is equal to the preset threshold value of the number of users in the groups, then for a user that has exceeded the preset first threshold value in the original sub-group, we can update it, and make it re-access the new sub-group. The specific re-access user can be determined in combination with the user access time or other factors. In addition, in the case that the preset first threshold value is equal to the preset threshold value of the number of users in the groups, or add a sub-group corresponding to the group when it is tested that all the numbers of users of the sub-groups reach the preset first threshold value to avoid the condition that the number of users in the sub-groups exceeds the preset threshold value of the number of users in the groups.

In the case that the preset first threshold value is less than the preset threshold value of the number of users in the groups, if the sub-group is allowed to be processed in the saturated state, you may not re-access the user exceeding the preset first threshold value in the original sub-group into other groups when a new sub-group corresponding to the group is added; if the sub-group is not allowed to be processed in the saturated state, we can update the user exceeding the preset first threshold value in the original sub-group and make it re-access the new sub-group when the new sub-group corresponding to the group is added. The specific re-access user can be determined in combination with the user access time or other factors, and a lot of details may be derived from here and will not be provided in the present disclosure.

Figure 4:
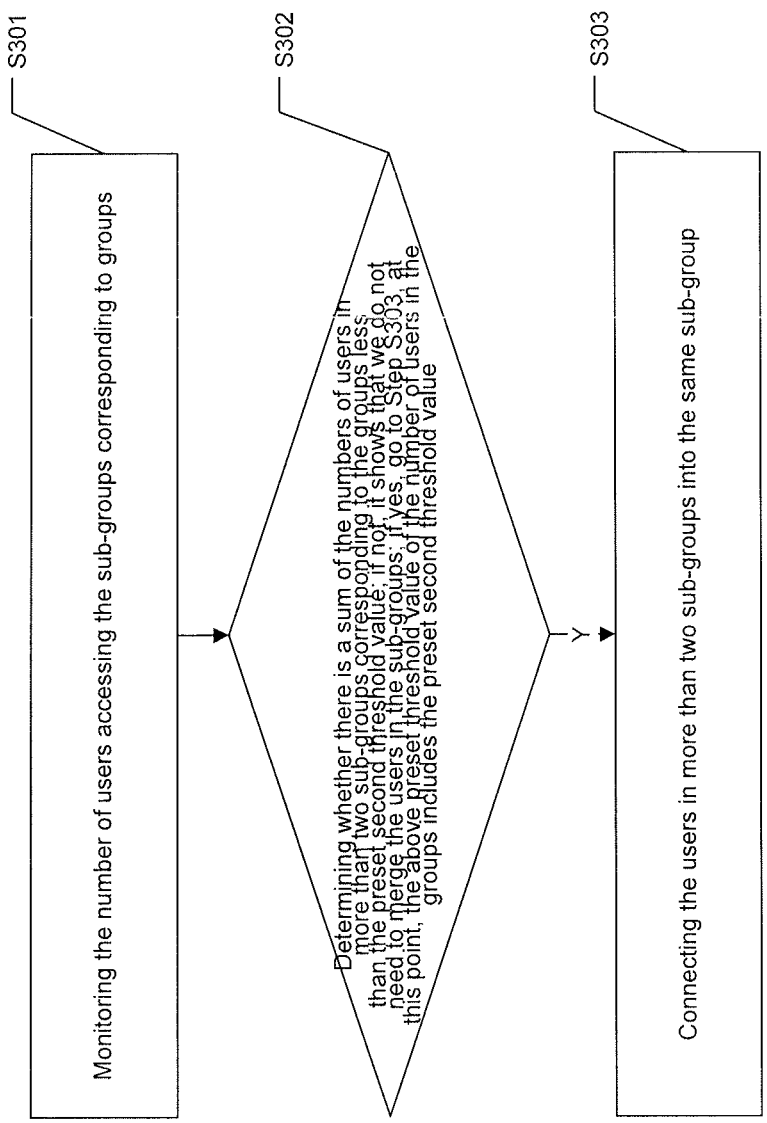
FIG. 4 is the flow diagram of dynamic adaptation based on the grouping processing method when the number of users of groups decreases.

FIG. 4 shows the flow diagram of the adjustment of the group processing method based on the present disclosure in an example when the number of users of groups decreases. Only illustration for the process from the number of users in the monitored sub-group to the merge of users in the sub-groups is available, as shown in FIG. 4.

The group processing method in the concrete example includes the following steps, as shown in FIG. 4:

Step S301: monitoring the number of users accessing the sub-groups corresponding to groups;

Step S302: determining whether there is a sum of the numbers of users in more than two sub-groups corresponding to the groups less than the preset second threshold value; if not, it shows that we do not need to merge the users in the sub-groups; if yes, go to Step S303, at this point, the above preset threshold value of the number of users in the groups includes the preset second threshold value;

Step S303: connecting the users in more than two sub-groups into the same sub-group.

The preset second threshold value here may be set based on the actual needs. For example, we can set it as the same to the preset threshold value of the number of users in the groups for sub-groups. It may also be set as a value less than the preset threshold value of the number of users in the groups in order to avoid the sub-groups up to the saturated capacity.

This value may be either a specific number of users or the proportion relative to the preset threshold value of the number of users in the groups. In practical application, the preset second threshold value can be set as the same to the above preset first threshold value.

In order to enable the sub-group to have a certain capacity after the users in more than two sub-groups access the same sub-group, the preset second threshold value can also be set as a value less than the preset first threshold value.

As mentioned above, in the case of different preset threshold values of the number of users in the groups set for the sub-groups, the preset second threshold value will be related to the preset threshold value of the number of users in the groups corresponding to each sub-group, and a lot of details may be derived from here and will not be provided in the present disclosure.

When accessing the users in more than two sub-groups into the same sub-group, we can do it in a variety of possible ways, for example, make the users in more than two sub-groups access the any of more than two sub-group, or make all users in more than two sub-groups access this new sub-group after creating a new sub-group for the group, or make users in more than two sub-groups access the sub-group of more than two sub-groups with greater preset threshold value of the number of users in the groups under the condition that the preset threshold values of the number of users in the groups for the sub-groups are unequal, etc., and the specific merger access way may be in a variety of possible ways, and a lot of details may be derived from here and will not be provided in the present disclosure.

In addition, it actually relates to the change and migration of the correspondence between users and corresponding sub-groups for merge access of users in more than two sub-groups, the specific change and migration way of correspondence may be in any way existing at present or possibly occurring later, and a lot of details may be derived from here and will not be provided in the present disclosure.

For the current sub-groups that are not accessed by users yet, the correspondence between the sub-group and group may be removed after the users in more than two sub-groups access the same sub-group to allow assignment of the sub-group to other groups to provide user access service.

Combining with the grouping processing method in the present disclosure, we will illustrate in detail below combined with one example. In the following illustration example, we will illustrate by taking the sub-groups with the same set size (namely that the sub-groups have the same preset threshold value of the number of users in the groups) and sub-groups with the same preset first threshold value as examples to facilitate easy understanding. This example is just for illustration, and this example does not limit the present disclosure to any specific pattern of manifestation.

In the example, assume that the preset threshold value of the number of users in the groups for the sub-groups is 100 persons, namely that the number of users in one sub-group is not more than 100 persons at most, the preset first threshold value of the sub-group is 80 persons, and there are 300 user members in a group M.

So we can assign or add three corresponding sub-groups to the group M under the condition that the sub-groups need to run at full capacity or have saturated capacity of users, and there are 100 persons in each sub-group, respectively. In this example, we will illustrate by taking the number of users in sub-groups not more than the preset first threshold value, 80 persons, as an example to avoid full load of sub-groups.

Accordingly, in this example, assume that there are currently four sub-groups corresponding to the group, recorded as M1, M2, M3, M4 respectively, and the numbers of users assigned in the sub-groups are 80, 75, 75, 75 respectively.

Since there may be a new user added to the group at any time and there may also be a user quitting the group at any time, the number of users in the group changes dynamically in real-time. Every time a user access request from a new user is received, we can make the new user access any of these sub-groups not reaching the preset first threshold value. In this example, since sub-groups M2, M3, M4 are not up to the preset first threshold value of 80 persons, we can make the user access any of sub-groups M2, M3, M4. In practical application, of course, we can also select a sub-group from M2, M3, M4 combined with other conditions to make the new user access the selected sub-group, and a lot of details may be derived from here and will not be provided in the present disclosure.

Perform real-time monitoring on the number of users in sub-groups M1, M2, M3, M4 corresponding to the groups, the specific way of real-time monitoring may be a monitoring process every certain period of time or monitoring every time a new user is added or there is a user quitting the group. The specific way of monitoring can be in a variety of possible ways, there is no limitation to the way used in the present disclosure as long as we can know the dynamic change in the number of users in the sub-groups corresponding to the groups.

After existing user quit, new user addition and other processes for several times, all the numbers of users in the sub-groups may have reached the preset first threshold value of 80 persons at some point. After all the numbers of users in sub-groups M1, M2, M3, M4 corresponding to the group M are monitored to reach or exceed the preset first threshold value of 80, we can add a corresponding new sub-group to the group M. In one way, we can add a corresponding new sub-group M5 to group M immediately after monitoring that all the numbers of users in sub-groups M1, M2, M3, M4 reach the preset first threshold value. In another way, considering that there may be a user quitting the group M, so we shall not add the corresponding new sub-group M5 to groups M until monitoring that all the numbers of users in sub-groups M1, M2, M3, M4 reach or exceed the preset first threshold value when receiving the new user access request. In practical application, we can set the conditions for adding a new sub-group based on the actual situation and a lot of details may be derived from here and will not be provided in the present disclosure.

In addition, since there may be a user quitting the group at any time, as mentioned above, the numbers of users in sub-groups M1, M2, M3 and M4 corresponding to group M may dynamically decrease. After the process of existing user quit several times, assume that all the numbers of users in sub-groups M2, M3 decrease and the sum of the numbers of users in sub-groups M2, M3 has been less than the preset second threshold value, we can merge the users in sub-groups M2, M3 to access the same sub-group. In the case that the preset second threshold value is the same to the preset first threshold value, if there is a new user added after merge, we can make the new user access sub-group M4 since sub-group M4 still has processing space. In the case that the preset second threshold value is different from the preset first threshold value, if there is a new user added after merge, we can make the new user access either sub-group M4 or merged sub-group since both sub-group M4 and merged sub-group still have processing space.

In the above description for the group processing method of the present disclosure, all are illustrated in combination with the number of users accessing the sub-group. In practical application, we can also use other information, such as user type, user access time, frequency of user access, user level, sub-group type, etc. to comprehensively determine which specific sub-group is to be accessed by users and adjust the sub-group corresponding to the group or the sub-group accessed by users based on the number of users accessing the sub-group on this basis, and a lot of details may be derived from here and will not be provided in the present disclosure.

Figure 5:
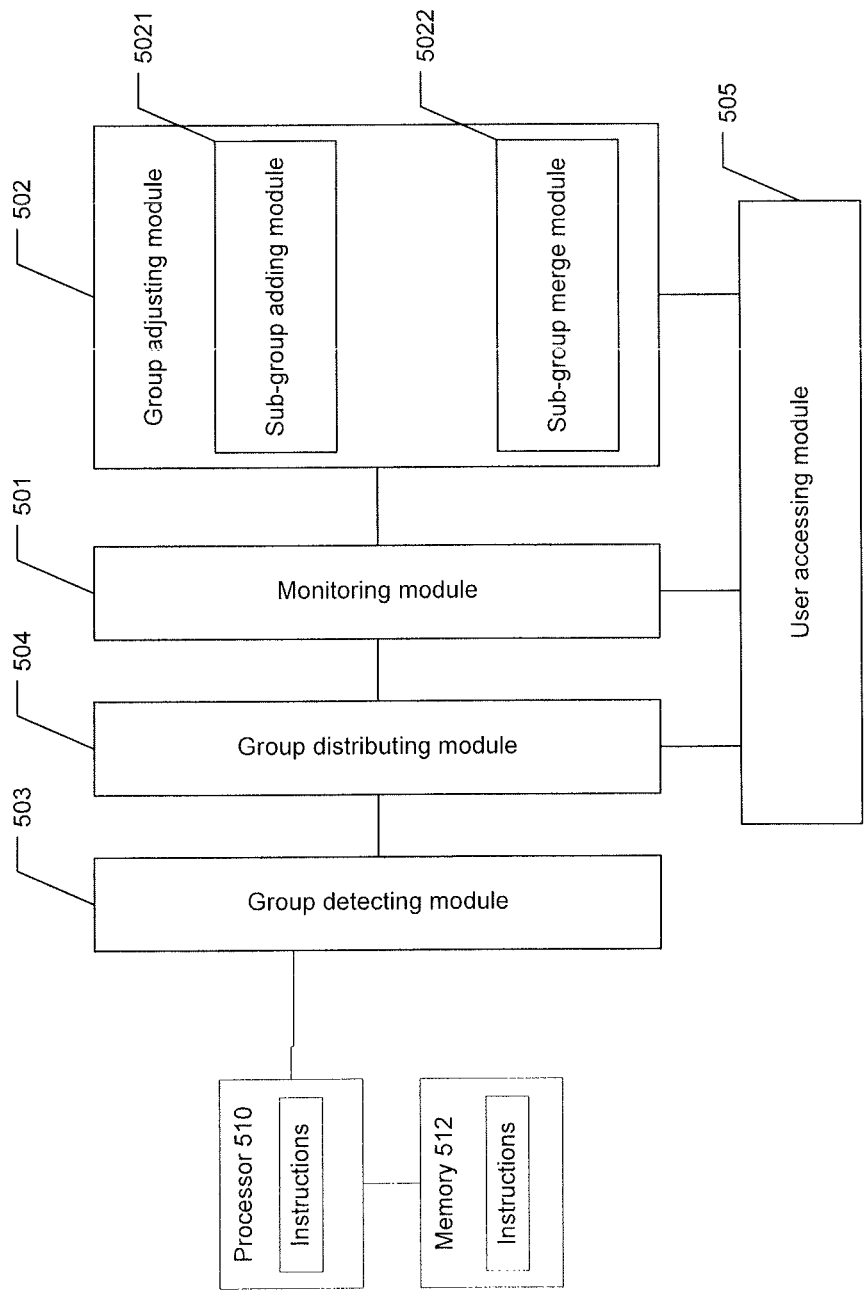
FIG. 5 is the structural schematic diagram of the grouping processing system.

The present disclosure also provides a grouping processing system based on the group processing method in the embodiment of the present disclosure. FIG. 5 shows the structural schematic diagram of the grouping processing system in the embodiment of the present disclosure. As shown in FIG. 5, the grouping processing system in this embodiment includes:

A monitoring module 501, configured to monitor the number of users accessing the sub-groups corresponding to groups;

A group adjusting module 502, configured to adjust the sub-groups corresponding to the groups and/or sub-groups accessed by users based on the number of users in the sub-groups monitored by monitoring module 501 and the preset threshold value of the number of users in the groups, wherein, any sub-group corresponds to any physical resource equipment, and any physical resource equipment corresponds to more than one sub-group.

According to the present disclosure, we provide the grouping processing service through sub-groups corresponding to groups and realize resource scheduling based on sub-groups. When providing a variety of services specific to groups, we provide resource scheduling service in sub-group. Any group may correspond to any physical resource equipment, any physical resource equipment may correspond to more than one sub-group, and thus we do not need to care about the specific resources of specific physical resource equipment and jump out of the constraint to the service capability of physical resource equipment. Thus, we can dynamically adapt the dynamic change in the number of users in groups, which is to optimize resource scheduling strategy.

The sub-group mentioned in the present disclosure may actually be understood as the preset unit for scheduling of the resources providing services for groups. In which, any sub-group may correspond to any physical resource equipment, any physical resource equipment may correspond to more than one sub-group, namely that, any physical resource equipment can provide more than one sub-group. Such a sub-group can be understood as an abstract group.

To facilitate a more clear understanding of the sub-group in the present disclosure, FIG. 2 shows a system architecture principle diagram based on the sub-group of the present disclosure.

As mentioned above, the sub-group in the present disclosure can be understood as an abstract group. Therefore, we give a description by taking the abstract group as an example on behalf of the sub-group in the present disclosure, as shown in FIG. 2. An architecture schematic diagram of the relationship between sub-groups or abstract groups, sub-groups or abstract groups and physical resource equipment in the room by taking the group in a room of a network application (online game, voice interaction application, network video application, etc.) as an example, as shown in FIG. 2. To facilitate understanding, we call the physical resource equipment as physical resource layer, the abstract group provided by physical resource equipment as abstract group layer, and the room corresponding to group as business announcement layer as shown in FIG. 2.

As shown in FIG. 2, the physical resource equipment may be in one or a group to provide group processing capacity, and the physical resource equipment may be different in group processing capacities. The specific group processing capacity relates to the largest number of users that can be contained in preset sub-groups, i.e. the preset threshold value of the number of users in the groups. For example, suppose that the preset threshold value of the number of users in the groups is K, namely that K users are taken as a sub-group, one of the physical resource equipment can provide service for 5K users, then the group processing capacity of the physical resource equipment based on the preset threshold value of the number of users in the groups is 5. In other words, the group processing capacity of the physical resource equipment can provide 5 sub-groups or sub-groups.

The preset threshold value of the number of users in the groups may be the same to the above preset threshold value of the number of users in the groups, and the above preset threshold value of the number of users in the groups can also be set based on the preset threshold value of the number of users in the groups. For example, the preset threshold value of the number of users in the groups can be the value obtained by multiplying the preset threshold value of the number of users in the groups by a certain proportion, we can adjust the sub-groups corresponding to groups and/or sub-groups accessed by users when the number of users in sub-groups reaches or exceeds the proportion value, and the specific proportion value can be set based on the actual needs.

Thus, we can add a corresponding quantity of sub-groups or abstract groups for the groups based on the actual number of users in the groups after knowing the group processing capacity of the physical resource equipment. When adding corresponding sub-groups or abstract groups to the groups, we do not care about which physical resource equipment provides the sub-groups or abstract groups specifically, just add the sub-groups or abstract groups directly as corresponding to the groups, in other words, register the sub-groups or abstract groups to the room of the groups. Thus, the sub-group or abstract group corresponding to a group may be provided by the same physical resource equipment or jointly provided by different physical resource equipment.

Among different physical resource equipment, any physical resource equipment only provides one or more of these sub-groups or abstract groups. Thus, when providing service for groups, we do not need to care about the specific processing capacity of physical resource equipment, but only provide service and schedule groups based on sub-groups or abstract groups.

As mentioned above, the sub-groups corresponding to the groups should have already existed when we monitor the number of users accessing the sub-groups corresponding to the groups and then adjust the sub-groups corresponding to the groups and/or the sub-groups accessed by users. Therefore, as shown in FIG. 5, the grouping processing system in the present disclosure also includes:

A group detecting module 503, configured to detect the number of users in the groups;

A group distributing module 504, configured to add sub-groups corresponding to the groups based on the number of users in the groups tested by group testing module 503 and the preset threshold value of the number of users in the groups.

All modules shown in FIG. 5 may be stored in memory 512 and to be executed by one or more processors 510.

The preset threshold value of the number of users in the groups here may be set based on the actual needs. In general, the preset threshold value of the number of users in the groups can be only a value, that is to say, the threshold values of the number of users in the sub-groups are the same.

In some special circumstances, we can also set more than two preset threshold values of the number of users in the groups, so that we can assign adaptive sub-groups for the groups based on the actual size of each sub-group.

In addition, since the preset threshold values of the number of users in the groups can be set based on the preset threshold value of the number of users in the groups, as mentioned above. In this case, with different preset threshold values of the number of users in the groups, the preset threshold value of the number of users in the groups corresponding each sub-group may or may not the same, but they can be set based on the same scale.

For example, all the preset threshold values of the number of users in the groups corresponding to the sub-groups are 80%, 85% . . . etc. of corresponding preset threshold value of the number of users, and a lot of details may be derived from here and will not be provided in the present disclosure.

It may be used for migration of the currently existing group processing method by detecting the number of users in groups and adding sub-groups corresponding to the groups herein, for example, adjust the existing method of corresponding coupling between groups and server into the method of corresponding coupling between groups and sub-groups in the embodiment of the present disclosure, etc.

In the case of a new group, we can first build a sub-group corresponding to the group, then make dynamic adjustment of the sub-group corresponding to the group based on the change in the number of users accessing the group in the follow-up process, and the dynamic adjustment here may be either addition of corresponding new sub-group to the group or reduction of corresponding sub-group from the group.

Due to the real-time change characteristic of the number of users in the groups, the user access request from the user to request for accessing the group may be received at any time in the follow-up process. Upon receiving the user access request, the user can be accessed into any sub-group corresponding to the group and having the number of users less than the preset first threshold value.

Therefore, as shown in FIG. 5, the group processing system of the present disclosure may also include:

A user accessing module 505, configured to connect the user to any sub-group corresponding to the group and having the number of users less than the preset first threshold value when the user access request of user for accessing the group is received.

As mentioned above, due to the real-time change characteristic of the number of users in the groups, the number of users in the groups has real-time dynamic changes, so we need to dynamically adjust the sub-group corresponding to the group to adapt to the number of users in the group.

During specific dynamic adaptation, since both increase and decrease in the number of users may be involved, as shown in FIG. 5, in the group processing system of the embodiment of the present disclosure, the above group adjusting module 502 may include:

A sub-group adding module 5021, configured to add new sub-groups corresponding to the groups when all the numbers of users in the sub-groups corresponding to the groups are greater than or equal to the preset first threshold value, and make the new accessing users in the groups access the new sub-groups. At this point, the preset threshold value of the number of users in the groups includes the preset first threshold value;

A sub-group merge module 5022, configured to connect the user in more than two sub-groups to the same sub-group when the sum of the numbers of users in more than two sub-groups corresponding to the groups is less than the preset second threshold value. At this point, the preset threshold value of the number of users in the groups includes the preset second threshold value.

Both the preset first threshold value and preset second threshold value may be set based on the actual needs.

For the preset first threshold value, it may be set as the same to the preset threshold value of the number of users in the groups for sub-groups during specific setting.

The preset first threshold value may also be set as a value less than the preset threshold value of the number of users in the groups in order to avoid the sub-groups up to the saturated capacity. This value can be either a specific number of users or the proportion relative to the preset threshold value of the number of users in the groups.

In the case of different preset threshold values of the number of users in the groups set for the sub-groups as mentioned above, the preset first threshold values corresponding to the sub-groups can also be different, and a lot of details may be derived from here and will not be provided in the present disclosure.

For the preset second threshold value, it may be set as the same to the preset threshold value of the number of users in the groups for sub-groups.

The preset second threshold value may also be set as a value less than the preset threshold value of the number of users in the groups in order to avoid the sub-groups up to the saturated capacity. This value can be either a specific number of users or the proportion relative to the preset threshold value of the number of users in the groups.

In practical application, the preset second threshold value can be set as the same to the above preset first threshold value. In order to enable the sub-group to have a certain capacity after the users in more than two sub-groups access the same sub-group, the preset second threshold value can also be set as a value less than the preset first threshold value.

As mentioned above, in the case of different preset threshold values of the number of users in the groups set for the sub-groups, the preset second threshold value will be related to the preset threshold value of the number of users in the groups corresponding to each sub-group, and a lot of details may be derived from here and will not be provided in the present disclosure.

When adding a new sub-group corresponding to the group, we can add a new sub-group to the group immediately after all the numbers of users in the sub-groups are monitored to be greater than or equal to the preset first threshold value, so we can directly assign the new user to the new sub-group when the user access request is received subsequently.

In another implementation mode, a new sub-group corresponding to the group may also be added after all the numbers of users in the sub-groups are monitored to see whether they are greater than or equal to the preset first threshold value when the user access request is received, and assign the new user to the new sub-group. The specific implementation mode can be set based on the actual needs, and a lot of details may be derived from here and will not be provided in the present disclosure.

When connecting the users in more than two sub-groups into the same sub-group, we may do it in a variety of possible ways.

For example, make the users in more than two sub-groups access any of more than two sub-group, or make all users in more than two sub-groups access this new sub-group after creating a new sub-group for the group, or make users in more than two sub-groups access the sub-group of more than two sub-groups with greater preset threshold value of the number of users in the groups under the condition that the preset threshold values of the number of users in the groups for the sub-groups are unequal, etc., and the specific merger access way may be in a variety of possible ways and a lot of details may be derived from here and will not be provided in the present disclosure.

In addition, it actually relates to the change and migration of the correspondence between users and corresponding sub-groups for merge access of users in more than two sub-groups, the specific change and migration way of correspondence may be in any way existing at present or possibly occurring later, and a lot of details may be derived from here and will not be provided in the present disclosure.

For the current sub-groups not accessed by users yet, the correspondence between the sub-group and group may be removed after the users in more than two sub-groups access the same sub-group to allow assignment of the sub-group to other groups to provide user access service.

Ordinary technicians in this field can understand that all or part of the flow in the method of the above embodiment can be completed by commanding related hardware through a computer program, which can be stored in a readable computer storage medium, and the program can include a flow of the embodiment of each method as mentioned above during execution. Wherein, the storage medium may be a disk, CD, Read-Only Memory (ROM) or Random Access Memory (RAM), etc.

The instructions that are stored in the non-transitory computer readable medium, when executed by a processor, may:

Monitor a number of users accessing a sub-group that is corresponding to a group; according to the number of users in the sub-group and a preset threshold of the number of users for the sub-group, adjust the sub-group corresponding to at least one of: the group and user access wherein the sub-group corresponds a physical resource equipment and the physical resource equipment corresponds to more than one of sub-groups;

Add a new sub-group that is corresponding to the group wherein the preset threshold of the number of users for the sub-group includes the preset first threshold when the number of users in the sub-group corresponding to the group is greater than or equal to a preset first threshold; and Connect the users of the more than one of sub-groups to one of the more than one of sub-groups wherein the preset threshold of the number of users for the sub-group includes the preset second threshold when a sum of the number of users in the more than one of sub-groups corresponding to the group is less than a preset second threshold.

The embodiments mentioned above only expresses some implementation methods of the present disclosure, its description is specific and detailed, but cannot be so understood as a limitation to the scope of the present disclosure. It should be noted that for ordinary technicians in this field, they can also make several deformations and improvements on the premise of not being separated from the conception of the present disclosure, and all these are in the protection scope of the present disclosure. Therefore, the scope of patent protection of the present disclosure shall be subject to the claims enclosed.

We claim:

1. A method for grouping users of a system, comprising:
   in a device comprising a processor and a memory, wherein the memory stores instructions that when executed by the processor cause the processor to perform the method:
   detecting a number of users in a group;
   according to the number of users in the group and a preset threshold for a number of users in a sub-group, adding, by the device, a sub-group that services the group;
   monitoring a number of users accessing the sub-group of physical resource equipment servicing the group; and
   according to the number of users accessing the sub-group and the preset threshold for the number of users in a sub-group, adjusting, by the device, the sub-group with servicing the group,
   wherein the physical resource equipment services more than one sub-groups and the quantity of sub-groups that can service the group depends on a group processing capacity of the physical resource equipment that services the group.

2. The grouping method according to claim 1, wherein the adjusting comprises:
   when the number of users accessing the sub-group servicing the group is greater than or equal to a preset first threshold, adding, by the device, a new sub-group for servicing the group wherein the preset threshold of the number of users for the sub-group includes the preset first threshold; and
   when a sum of the number of users of the more than one of sub-groups servicing the group is less than a preset second threshold, connecting, by the device, the users of the more than one sub-groups to a second one of the more than one of sub-groups wherein the preset threshold of the number of users for the sub-group includes the preset second threshold.

3. The grouping method according to claim 2, wherein the preset second threshold is less than or equal to the preset first threshold.

4. The grouping method according to claim 2, further comprising:
   when a request is received from a user to access the group, connecting, by the device, the user to the sub-group corresponding to the group wherein the number of users for the sub-group is less than the preset first threshold.

5. A grouping processing system, comprising:
   one or more processors;
   memory comprising instructions executable by the processor;
   wherein the processor when executing the instructions is configured to:
   detect a number of users in a group;
   according to the number of users in the group and a preset threshold for a number of users in a sub-group, add by the device, a sub-group that corresponds to the group;
   monitor a number of users accessing the sub-group that corresponds to the group; and
   adjust, according to the number of users in the sub-group and a preset threshold of the number of users for the sub-group, the sub-group that corresponds to the group or user access,
   wherein the sub-group corresponds to physical resource equipment and the physical resource equipment corresponds to more than one of sub-groups, and the quantity of sub-groups that can be added to the group depends on a group processing capacity of the physical resource equipment that services the group.

6. The grouping processing system according to claim 5, wherein the processor when executing the instructions is further configured to:
   add a new sub-group that corresponds to the group, wherein the preset threshold of the number of users for the sub-group includes the preset first threshold when the number of users in the sub-group that corresponds to the group is greater than or equal to a preset first threshold; and
   connect the users of the more than one of sub-groups to one of the more than one of sub-groups wherein the preset threshold of the number of users for the sub-group includes the preset second threshold when a sum of the number of users in the more than one of sub-groups corresponding to the group is less than a preset second threshold.

7. The grouping processing system according to claim 6, wherein the preset second threshold is less than or equal to the preset first threshold.

8. The grouping processing system according to claim 6, wherein the processor when executing the instructions is further configured to:
   connect the user to the sub-group that corresponds to the group wherein the number of users for the sub-group is less than the preset first threshold when a request is received from a user to access the group.

9. A non-transitory computer readable storage medium having stored thereon computer program instructions that, when executed by a processor, cause the processor to:
   monitor a number of users accessing a sub-group that is corresponding to a group;

according to the number of users in the sub-group and a preset threshold of the number of users for the sub-group, adjust the sub-group corresponding to the group and/or user access, wherein the sub-group corresponds a physical resource equipment and the physical resource equipment corresponds to more than one of sub-groups;

add a new sub-group that is corresponding to the group wherein the preset threshold of the number of users for the sub-group includes the preset first threshold when the number of users in the sub-group corresponding to the group is greater than or equal to a preset first threshold wherein the quantity of sub-groups that can be added to the group depends on a group processing capacity of the physical resource equipment that services the group; and connect the users of the more than one of sub-groups to one of the more than one of sub-groups wherein the preset threshold of the number of users for the sub-group includes the preset second threshold when a sum of the number of users in the more than one of sub-groups corresponding to the group is less than a preset second threshold.

10. The non-transitory computer readable storage medium of claim 9, wherein the preset second threshold is less than or equal to the preset first threshold.

* * * * *